Figure 1:
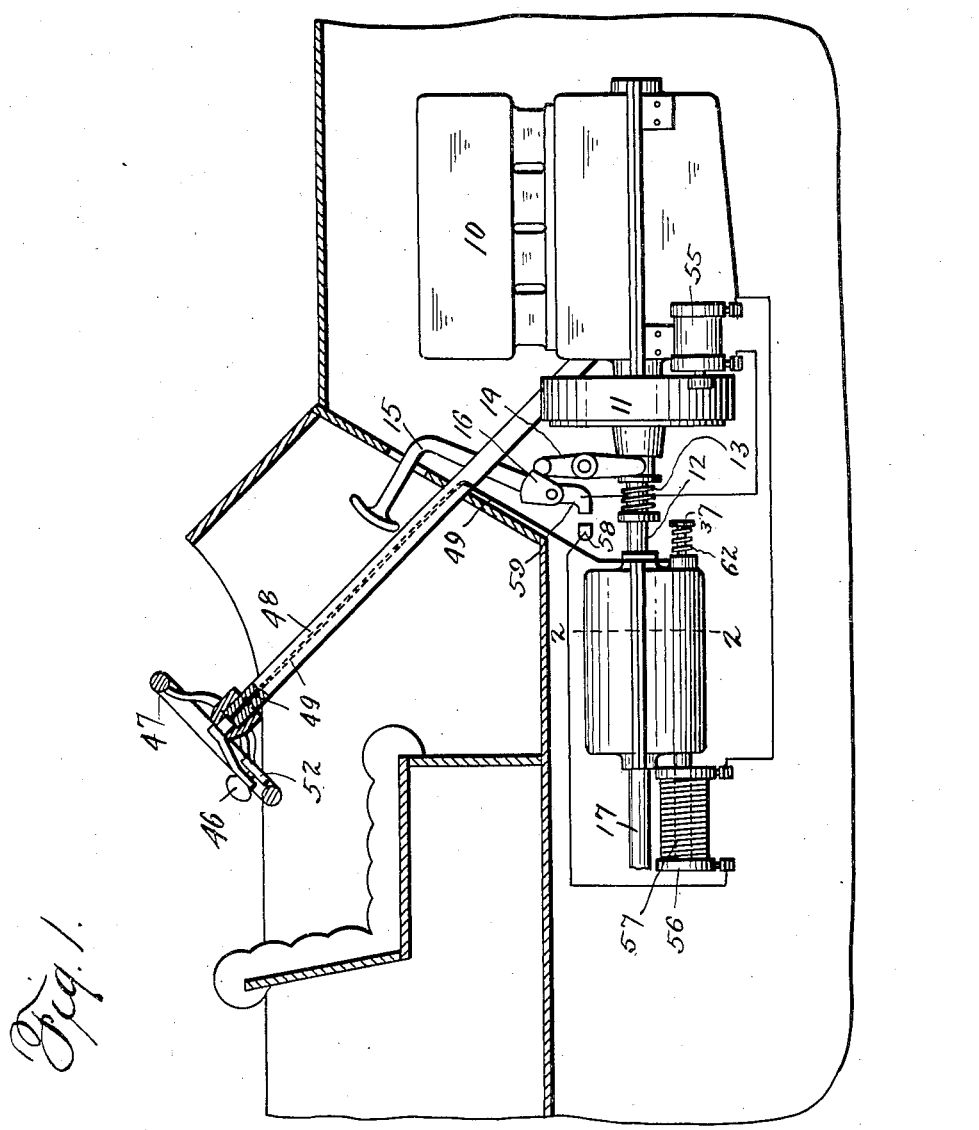

M. S. CURTIS.
AUTOMOBILE GEAR SHIFT.
APPLICATION FILED JULY 10, 1914.

1,131,042.

Patented Mar. 9, 1915.
4 SHEETS—SHEET 1.

WITNESSES:
E. Leckert
A. P. Hayes

INVENTOR
Myron S. Curtis
BY
Chas. J. Williamson
ATTORNEY

M. S. CURTIS.
AUTOMOBILE GEAR SHIFT.
APPLICATION FILED JULY 10, 1914.
1,131,042.
Patented Mar. 9, 1915.
4 SHEETS—SHEET 2.
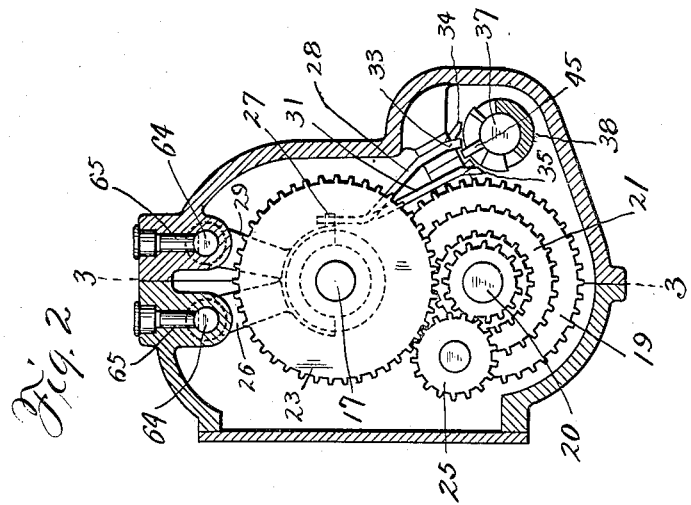
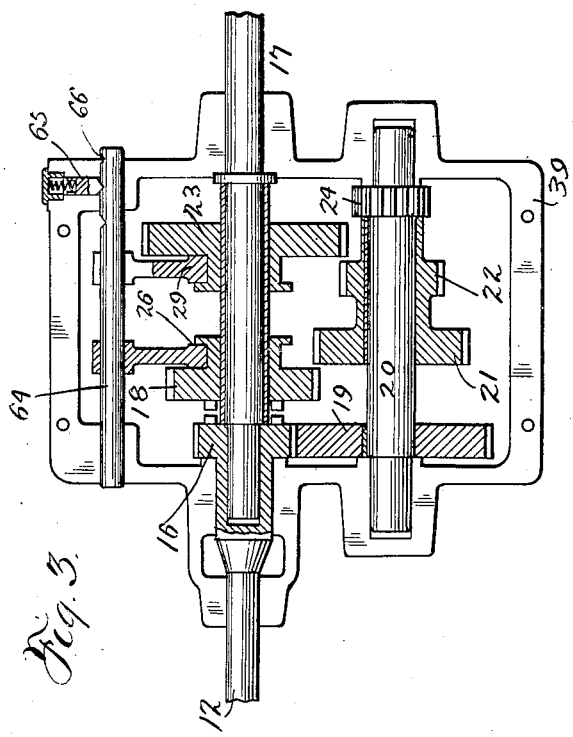
WITNESSES:
E. Leckert
A. J. Hayes
INVENTOR
Myron S. Curtis
BY
Chas. J. Williamson
ATTORNEY M. S. CURTIS.
AUTOMOBILE GEAR SHIFT.
APPLICATION FILED JULY 10, 1914.
1,131,042.
Patented Mar. 9, 1915.
4 SHEETS—SHEET 3.
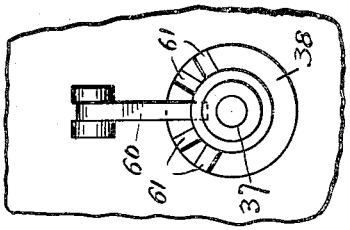
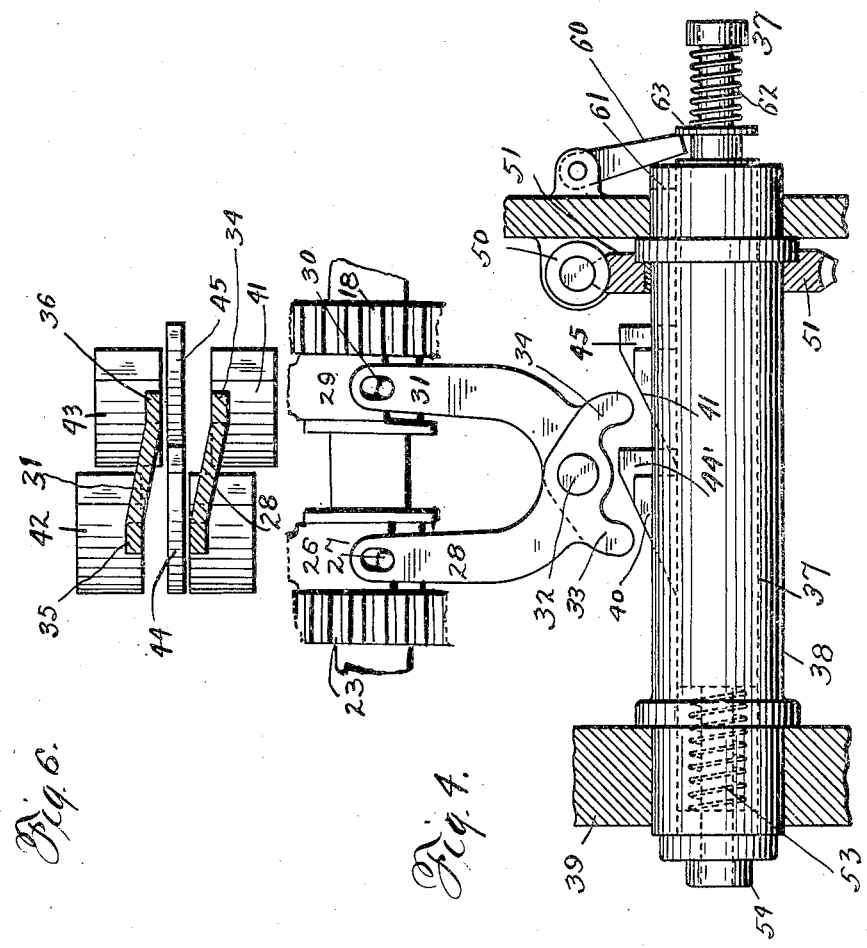
WITNESSES:
E. Leckerh
A. P. Hayes
INVENTOR
Myron S. Curtis
BY Chas. J. Williamson
ATTORNEY M. S. CURTIS.
AUTOMOBILE GEAR SHIFT.
APPLICATION FILED JULY 10, 1914.
1,131,042.
Patented Mar. 9, 1915.
4 SHEETS—SHEET 4.
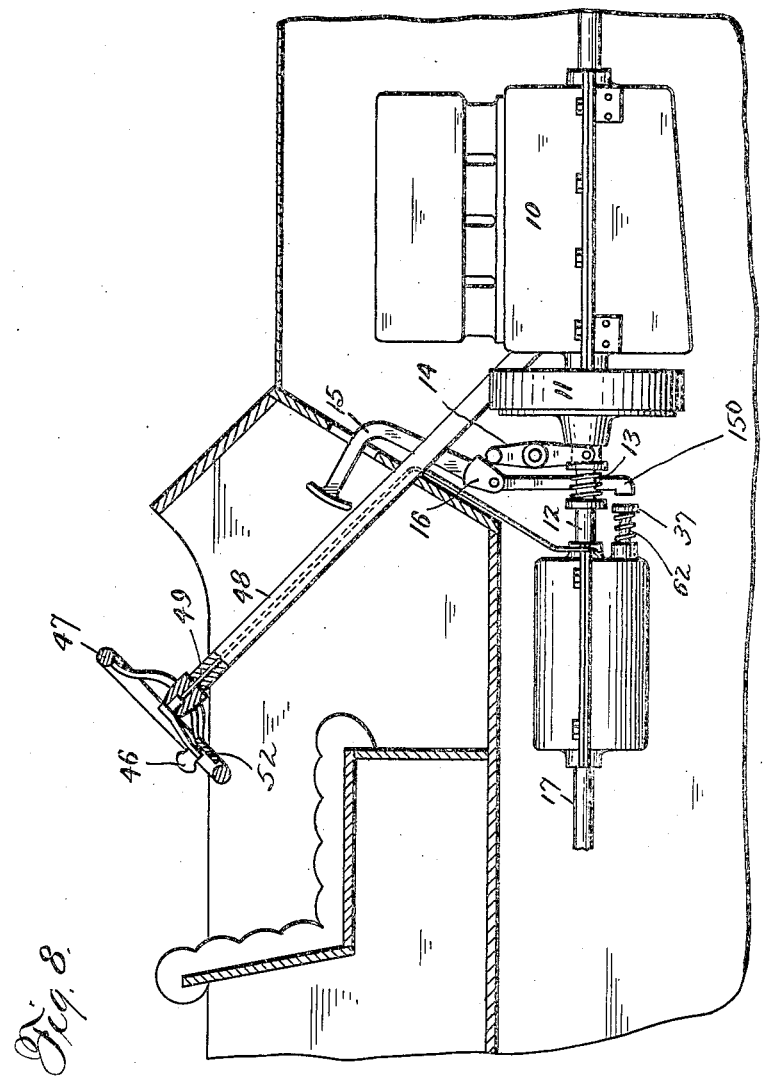
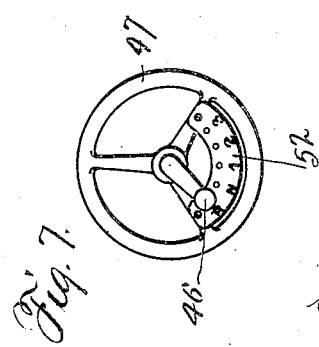
WITNESSES:
E. Leckert
A. P. Hayes
INVENTOR
Myron S. Curtis,
BY
Chas. J. Williamson
ATTORNEY

UNITED STATES PATENT OFFICE.

MYRON S. CURTIS, OF PAWTUCKET, RHODE ISLAND.

AUTOMOBILE GEAR-SHIFT.

1,131,042.

Specification of Letters Patent.

Patented Mar. 9, 1915.

Application filed July 10, 1914. Serial No. 850,165.

*To all whom it may concern:*

Be it known that I, MYRON S. CURTIS, of Pawtucket, in the county of Providence, and in the State of Rhode Island, have invented a certain new and useful Improvement in Automobile Gear-Shifts, and do hereby declare that the following is a full, clear, and exact description thereof.

My invention relates to transmission gearing and such gearing as adapted more particularly to automobiles for changing the speed, and in its best form my invention affords the advantages of mechanical simplicity so that the mechanism is easily and cheaply manufactured and not easy to be put out of order; impossibility of changing the gear connections unless the clutch between the motor and the transmission is disengaged so that danger of stripping gears is obviated; ability for the selection of the desired change in advance of the time of making the change so that the driver is able to prepare in advance for hills, crowded traffic, etc., and the employment of a single lever, preferably a foot lever for operating the clutch and, causing the shifting of the gears so that one continuous motion instead of several disconnected motions is required and, by the use of the foot lever for the operation both hands are left free for manipulating the steering wheel.

In the drawings—Figure 1 is a view in side elevation, with parts in section, of a driving mechanism of a motor car embodying one form of my invention; Fig. 2 is a vertical section on the line 2—2 of Fig. 1; Fig. 3 is a vertical section on the line 3—3 of Fig. 2; Fig. 4 is a detail view on a larger scale partly in elevation and partly in section of the shipping mechanism; Fig. 5 is a detail end view thereof; Fig. 6 is a detail section on the line 6—6 of Fig. 4; Fig. 7 is a detail plan view of the steering wheel and the speed-changing handle and index; Fig. 8 is a view similar to Fig. 1 showing a different embodiment of my invention.

The motor 10 shown is of the usual construction having a friction clutch 11 by which the transmission shaft 12 may be clutched and unclutched from the engine, the cone of the friction clutch being yieldingly moved to and held in clutching engagement by a coil spring 13 and moved in the opposite direction by means of a lever 14 which is actuated by a treadle 15 having a cam 16 that directly engages the lever 14, the cam serving first to release the clutch and to hold it in unclutching position during a further movement of the treadle for producing the shipping of the gears to change the speed. Such movement of the gears may be produced by power derived from the engine, as in the embodiment of my invention shown in Fig. 1, or in the construction shown in Fig. 8, the driver by the pressure of his foot upon the treadle effects the shipping of the gear, all as more particularly described hereinafter.

On the end of the transmission shaft 12 is a clutch gear 16 from which power, either directly or indirectly through the change gears is imparted to the shaft 17 which alines with the shaft 12 and which, as usual, is connected with the rear wheels on the car to impart the driving power thereto. Slidably mounted on the shaft 17 is a clutch gear 18 which is adapted to be engaged with the clutch of the gear 16 for the direct driving of the shaft 17, or to be disengaged therefrom for the indirect driving of the shaft 17. The clutch gear 16 meshes with a gear 19 on the counter shaft 20 and keyed to the counter shaft 20 are a medium speed gear 21 and a slow speed gear 22. The clutch gear 18 is shiftable into engagement with the medium speed gear 21. For the transmission of power to the shaft 17 from the slow speed gear 20 a slidable gear 23 is mounted on the shaft 17. Also on the counter shaft 20 is a reverse gear 24 meshing with an idler gear 25 with which the gear 23 meshes.

The hub of the gear 18 has an annular groove which receives a yoke 26 having a radial pin, or stud 27 which is engaged by one end of a shipping lever 28 and the hub of the gear 23 is similarly engaged by a yoke 29 having a radial pin or stud 30 which is engaged by one end of a shipping lever 31 so that by the vibration of these levers said gears may be made to occupy inactive or neutral position or meshed or connected with the gears 21 and 22 on the counter shaft, the movements of the gears 18 and 23, however, being such so that before one may be placed in mesh the other must be placed in neutral position. Both shipping levers are pivoted to a common shaft, or pivot 32, and both have two operating lugs on opposite sides of the pivot, the lever 28 having the two fingers 33 and 34 and the lever 31 having the two corresponding fingers 35 and 36, which fingers of the respective levers are in position to be engaged by slidable cams which by engaging the fingers impart the desired movements to the respective levers. There are six of these cams in the form of lugs with simple inclined surfaces which are mounted on the periphery of a longitudinally slidable bolt or shaft 37 which is supported within a tube or sleeve 38 suitably supported at its ends in bearings in the gear frame or casing 39, so that it may be partially rotated or oscillated upon its longitudinal axis. When the sleeve 38 turns on its axis it carries with it the lug-carrying bolt, the lugs of which project through the sleeve beyond the periphery thereof, as clearly shown in Fig. 4, and the purpose of such rotary movement is to place certain of the cams at a time in position to operate the shipping levers 28 and 31. The movement of each shipping lever to neutral position is effected in each case by two cams, which, for convenience I shall term neutralizing cams, there being such a cam 40 to act upon the finger 33 and a neutralizing cam 41 to act upon the finger 34 of the shipping lever 28 and a neutralizing cam 42 to act upon the lug 35 and a neutralizing cam 43 to act upon the lug 36 of the shipping lever 31, the corresponding neutralizing lugs being arranged in alinement around the bolt, or shaft 37 and in the space between them are two cams, one 44 to act upon the fingers of the shipping levers 28 and 31 to throw the gears 18 and 23 from neutral into one of their active or meshing positions, and a cam 45 to act upon the fingers of said shipping levers to throw them from neutral into the other of their active, or meshing positions. By reference to Fig. 6, it will be seen that the fingers of each shipping lever are offset at right angles to the direction of their swinging movement so that but one finger of each of the levers at a time may be engaged by cams 44 and 45, the finger engaged being determined by the position to which the cam may be moved by rotating the bolt 37.

A very simple and very convenient arrangement for rotating the shipping lever actuating cams is shown in the drawings, which consists of a rotary handle 46 mounted concentric with the steering wheel 47 on the steering column 48 which is connected to a flexible shaft 49 that passes through the steering column and has fixed to it a worm 50 which meshes with a worm wheel 51 on the sleeve 38. An index plate 52 is attached to the steering wheel with suitable marks to indicate the various gear changes, such for example as shown in Fig. 7, "R," for reverse and "N." for neutral and "1, 2, 3" to indicate the three speeds. The cam-carrying bolt or shaft 37 is moved to and yieldingly held at one limit of its longitudinal motion by means of a coil spring 53 that encircles a stem or reduced portion thereof and which is situated within the sleeve 38, its movement under the action of the spring being fixed by a stop collar 54. For moving the cam-carrying bolt 37 in the opposite direction for the purpose of bringing its cams to position for engagement with the fingers of the shipping lever and thus moving the latter, the foot lever 15 may, as shown in Fig. 8, have an arm or extension 150 that engages the end of the bolt or shaft 37 when the foot lever movement is continued after it has acted by its cam 16 to release the clutch 19; or, as is a very desirable arrangement, power taken from the engine may be utilized to cause such operating movement of the cam-carrying bolt or shaft 37, as is illustrated in Fig. 1, where electrical means are provided for the purpose which includes a magneto generator 55 driven from the fly wheel of the engine, a solenoid 56 in circuit with the generator and whose core 57 is attached to or is a prolongation of the bolt 37 and a switch consisting of a fixed contact 58 and a movable contact 59 which is carried by the treadle 15. Of course, instead of electrical means for using the power of the engine to throw the gears into active or meshing position, mechanical means might be employed.

The cam-carrying bolt 37 is locked in each of its several rotary positions for which purpose a finger 60 is provided adapted to engage any one of the series of notches 61 in one end of the sleeve 38 when a notch by the turning of the sleeve alines with the latch, a spring 62 on the bolt 37 acting by pressing against a collar 63 having an annular groove which contains the free end of the latch 60 to throw the latch into any one of the alining notches 61. The latch is thrown and held out of engagement with the notches when the bolt 37 is moved by the action of its spring 53 into inoperative position.

For yieldingly holding the gears 18 and 23 in each of their three positions, a similar device is employed in each case which consists of a sliding rod 64 to which the yoke 26 or 29, as the case may be, is attached, and a spring-pressed pawl 65 having a beveled nose adapted to engage any one of three V-shape notches 66 in the bars 64.

As the parts are shown in the drawings, the gears 18 and 23 are in neutral position. To briefly describe the operation of my invention, consider that the gear 23 is in mesh with the gear 22 and it is desired to place gear 18 in mesh with gear 21. The driver at any desired time moves the handle 46 to the position marked 2 on the index or dial 52 and thereby rotates the sleeve 38 to place the cam lug 45 in position to act upon the finger 36 of the shipping lever 31 which controls the gear 18. Nothing more than this need be done until it is desired to shift the gears whereupon the foot lever 15 is depressed with the result, first that the cam 16 acting on the lever 14 will release the clutch and then on the continued movement of the treadle the cam-carrying bolt 37 will be moved longitudinally causing first the neutralizing cam 41 to act on the finger 34 of the shipping lever 28 to bring the gear 23 to neutral position and the cam 45 acting on the finger 36 of the shipping lever 31 brings the gear 18 into neutral position. Further movement of the bolt or shaft 37 causes the cam lug 45 to still further move the shipping lever 31 and thereby throw the gear 18 into mesh with the gear 21. The driver now releasing pressure on the treadle 15, the spring 53 acts to return the cam-carrying bolt 37 to its former position and the spring 13 thrusts the cone of the clutch into clutching position.

It will be observed that the mechanism embodying my invention makes it unnecessary for the clutch to be released and the gears placed in a neutral position before it is possible to select the desired speed arrangement, and a simple movement in one direction accomplishes both the neutralizing of the gears and the shifting of the desired gear into mesh. As a result of this the selection of any desired speed arrangement may be done at any time in advance of the actual shifting of the gears and the mechanism is of simple construction.

Having thus described my invention what I claim is—

1. In a transmission mechanism, the combination of a driving shaft, a driven shaft, several sets of gears adapted to connect the two shafts at different times, and means to change the gear connections comprising a rotary and axially movable cam carrying member, and means to transmit axial motion thereof to the gears.

2. In a transmission mechanism, the combination of a driving shaft, a driven shaft, several sets of gears adapted to connect the two shafts at different times, means to change the gear connections comprising a rotary and axially movable cam carrying member, and means to transmit motion thereof to the gears, a clutch for the driving shaft, and a single operating member to control said clutch and the axial movement of the cam-carrying member.

3. In a transmission mechanism, the combination of a driving shaft, a driven shaft, several sets of gears adapted to connect the two shafts at different times, means to change the gear connections comprising a rotary and axially movable cam-carrying member, and means to transmit axial motion thereof to the gears, a motor, and means transmitting energy from the motor to impart such axial movement.

4. In a transmission mechanism, the combination of a driving shaft, a driven shaft, several sets of gears adapted to connect the two shafts at different times, means to change the gear connections comprising a rotary and axially movable cam carrying member, and means to transmit axial motion thereof to the gears, a motor, means transmitting energy from the motor to impart such axial movement, a clutch between the motor and the driving shaft and a single operating member to control said clutch and the axial movement of the cam carrying member.

5. In a transmission mechanism, the combination of a driving shaft, a driven shaft several sets of gears to connect the shafts at different times, and means to change the gear connection comprising a gear shifting device for one gear of each set, a rotary and axially movable member carrying a plurality of cam surfaces that coact with said gear shifting devices, means to rotate said member to select the cam surfaces to act, and means to move the member axially after such selection.

6. In a transmission mechanism, the combination of a driving shaft, a driven shaft several sets of gears to connect the shafts at different times, and means to change the gear connection comprising a lever for one gear of each set, said lever having two fingers on opposite sides of its pivot which are offset in the direction of the lever axis, and a rotary and axially movable member having a plurality of cam surfaces that coact with said fingers.

7. In a transmission mechanism, the combination of a driving shaft, a driven shaft several sets of gears to connect the shafts at different times, and means to change the gear connection comprising a lever for one gear of each set, said lever having two fingers on opposite sides of its pivot which are offset in the direction of the lever axis, and a rotary and axially movable member having a plurality of cam surfaces that coact with said fingers, a clutch for the driving shaft, a treadle lever, and means to transmit motion from the lever to the clutch to release it and to cause the cam carrying member to move axially.

8. In a transmission mechanism, the combination of a driving shaft, a driven shaft, several sets of gears adapted to connect the two shafts at different times, and means to change the gear connections comprising a rotary and axially movable cam carrying member that in a single axial movement in one direction places one gear in neutral position and renders another gear active, and means to transmit axial motion thereof to the gears.

In testimony that I claim the foregoing I have hereunto set my hand.

MYRON S. CURTIS.

Witnesses:
 MITCHELL ADAMS,
 THOMAS HAMPSON.